United States Patent
Swarbrick et al.

(10) Patent No.: US 10,621,129 B2
(45) Date of Patent: Apr. 14, 2020

(54) PERIPHERAL INTERCONNECT FOR CONFIGURABLE SLAVE ENDPOINT CIRCUITS

(71) Applicant: Xilinx, Inc., San Jose, CA (US)

(72) Inventors: Ian A. Swarbrick, Santa Clara, CA (US); David P. Schultz, Longmont, CO (US)

(73) Assignee: XILINX, INC., San Jose, CA (US)

( * ) Notice: Subject to any disclaimer, the term of this patent is extended or adjusted under 35 U.S.C. 154(b) by 17 days.

(21) Appl. No.: 15/936,916

(22) Filed: Mar. 27, 2018

(65) Prior Publication Data

US 2019/0303323 A1  Oct. 3, 2019

(51) Int. Cl.
*G06F 13/362* (2006.01)
*G06F 13/40* (2006.01)
*G06F 1/06* (2006.01)

(52) U.S. Cl.
CPC .............. *G06F 13/362* (2013.01); *G06F 1/06* (2013.01); *G06F 13/4022* (2013.01)

(58) Field of Classification Search
CPC ........................... G06F 13/362; G06F 13/4022
USPC .................................. 710/3, 31, 38, 110, 300
See application file for complete search history.

(56) References Cited

U.S. PATENT DOCUMENTS

| | | | |
|---|---|---|---|
| 5,222,122 A * | 6/1993 | Hamilton | H04M 17/02 |
| | | | 379/102.01 |
| 5,590,118 A * | 12/1996 | Nederlof | H04L 45/00 |
| | | | 370/218 |
| 6,781,407 B2 | 8/2004 | Schultz | |
| 7,185,309 B1 | 2/2007 | Kulkarni et al. | |
| 7,199,608 B1 | 4/2007 | Trimberger | |
| 7,281,093 B1 | 10/2007 | Kulkarni et al. | |
| 7,301,822 B1 | 11/2007 | Walstrum, Jr. et al. | |
| 7,454,658 B1 | 1/2008 | Baxter | |
| 7,328,335 B1 | 2/2008 | Sundararajan et al. | |
| 7,380,035 B1 | 5/2008 | Donlin | |
| 7,420,392 B2 | 9/2008 | Schultz et al. | |
| 7,500,060 B1 | 3/2009 | Anderson et al. | |
| 7,521,961 B1 | 4/2009 | Anderson | |
| 7,574,680 B1 | 8/2009 | Kulkarni et al. | |

(Continued)

OTHER PUBLICATIONS

U.S. Appl. No. 16/041,473, filed Jul. 20, 2018, Swarbrick, Ian A., et al., San Jose, CA USA.

(Continued)

*Primary Examiner* — Idriss N Alrobaye
*Assistant Examiner* — Henry W Yu
(74) *Attorney, Agent, or Firm* — Patterson + Sheridan, LLP

(57) ABSTRACT

A peripheral interconnect for configuring slave endpoint circuits, such as may be in a configurable network, in a system-on-chip (SoC) is described herein. In an example, an apparatus includes a processing system on a chip, a circuit block on the chip, and a configurable network on the chip. The processing system and the circuit block are connected to the configurable network. The configurable network includes a peripheral interconnect. The peripheral interconnect includes a root node and a plurality of switches. The root node and the plurality of switches are connected in a tree topology. First branches of the tree topology are connected to respective slave endpoint circuits of the configurable network. The slave endpoint circuits of the configurable network are programmable to configure the configurable network.

20 Claims, 9 Drawing Sheets

(56) References Cited

U.S. PATENT DOCUMENTS

| | | |
|---|---|---|
| 7,576,561 B1 | 8/2009 | Huang |
| 7,650,248 B1 | 1/2010 | Baxter |
| 7,653,820 B1 | 1/2010 | Trimberger |
| 7,689,726 B1 | 3/2010 | Sundararajan et al. |
| 7,788,625 B1 | 8/2010 | Donlin et al. |
| 7,831,801 B1 | 11/2010 | Anderson |
| 8,006,021 B1 | 8/2011 | Li et al. |
| 8,020,163 B2 | 9/2011 | Nollet et al. |
| 8,214,694 B1 | 7/2012 | McKechnie et al. |
| 8,359,051 B2 * | 1/2013 | Marsden ............... H04W 8/26 455/500 |
| 9,152,794 B1 | 10/2015 | Sanders et al. |
| 9,165,143 B1 | 10/2015 | Sanders et al. |
| 9,230,112 B1 | 1/2016 | Peterson et al. |
| 9,323,876 B1 | 4/2016 | Lysaght et al. |
| 9,336,010 B2 | 5/2016 | Kochar |
| 9,411,688 B1 | 8/2016 | Poolla et al. |
| 9,652,252 B1 | 5/2017 | Kochar et al. |
| 9,652,410 B1 | 5/2017 | Schelle et al. |
| 10,243,882 B1 | 3/2019 | Swarbrick et al. |
| 2002/0004843 A1 * | 1/2002 | Andersson ............. H04L 45/00 709/238 |
| 2004/0114609 A1 | 6/2004 | Swarbrick et al. |
| 2004/0210695 A1 | 10/2004 | Weber et al. |
| 2006/0104267 A1 * | 5/2006 | Mondinelli ............. H04L 45/04 370/389 |
| 2008/0320255 A1 | 12/2008 | Wingard et al. |
| 2008/0320268 A1 | 12/2008 | Wingard et al. |
| 2010/0158023 A1 * | 6/2010 | Mukhopadhyay .. G06F 15/7825 370/401 |
| 2010/0161793 A1 * | 6/2010 | Young Hwan .......... G06F 15/16 709/224 |
| 2012/0036296 A1 | 2/2012 | Wingard et al. |
| 2015/0043575 A1 * | 2/2015 | Kumar ................. H04L 45/16 370/390 |
| 2016/0006471 A1 * | 1/2016 | Pande ................ G06F 15/7825 455/500 |
| 2017/0140800 A1 | 5/2017 | Wingard et al. |
| 2018/0139153 A1 * | 5/2018 | Moradi ................ G06N 3/049 |

OTHER PUBLICATIONS

U.S. Appl. No. 15/588,321, filed May 5, 2017, Camarota, R., et al., San Jose, CA USA.

ARM Limited, "AMBA 3 APB Protocol Specification," v1.0, Sep. 25, 2003, pp. 1-34, ARM Limited, Cambridge, United Kingdom.

ARM Limited, "AMBA 4 Axis-Stream Protocol Specification," v1.0, Mar. 3, 2010, pp. 1-42, ARM Limited, Cambridge, United Kingdom.

ARM Limited, "AMBA AXI and ACE Protocol Specification," Jun. 16, 2003, pp. 1-306, ARM Limited, Cambridge, United Kingdom.

Dally, William J. et al., "Deadlock=Free Message Routing in Multiprocessor Interconnection Networks," IEEE Transactions on Computers, May 1987, pp. 547-553, vol. C-36, No. 5, IEEE, Piscataway, New Jersey, USA.

Glass, Christopher et al., "The Turn Model for Adaptive Routing," Journal of the Association for Computing Machinery, Sep. 1994, pp. 874-902, vol. 41, No. 5, ACM, New York, New York, USA.

Rantala, Ville et al., "Network on Chip Routing Algorithms," TUCS Techncal Report No. 779, Aug. 2006, pp. 1-38, Turku Centre for Computer Science, Turku, Finland.

U.S. Appl. No. 15/990,506, filed May 25, 2018, Swarbrick, Ian A., et al., San Jose, CA USA.

U.S. Appl. No. 15/964,901, filed Apr. 27, 2018, Swarbrick, Ian A., San Jose, CA USA.

Xilinx, Inc., "Zynq-7000 AP SoC-32 Bit DDR Access with ECC Tech Tip", 15 pages, printed on Aug. 10, 2018, http://www.wiki.xilinx.com/Zynq-7000+AP+SoC+-+32+Bit+DDR+Access+with+ECC+Tech+Tip, San Jose, CA USA.

* cited by examiner

PERIPHERAL INTERCONNECT FOR CONFIGURABLE SLAVE ENDPOINT CIRCUITS

TECHNICAL FIELD

Examples of the present disclosure generally relate to electronic circuits and, in particular, to a peripheral interconnect for configuring slave endpoint circuits.

BACKGROUND

Advances in integrated circuit technology have made it possible to embed an entire system, such as including a processor core, a memory controller, and a bus, in a single semiconductor chip. This type of chip is commonly referred to as a system-on-chip (SoC). Other SoCs can have different components embedded therein for different applications. The SoC provides many advantages over traditional processor-based designs. It is an attractive alternative to multi-chip designs because the integration of components into a single device increases overall speed while decreasing size. The SoC is also an attractive alternative to fully customized chips, such as an application specific integrated circuit (ASIC), because ASIC designs tend to have a significantly longer development time and larger development costs. A configurable SoC (CSoC), which includes programmable logic, has been developed to implement a programmable semiconductor chip that can obtain benefits of both programmable logic and SoC.

SUMMARY

A peripheral interconnect for configuring slave endpoint circuits, such as may be in a configurable network, in a system-on-chip (SoC) is described herein. The peripheral network can be a distributed, low-overhead, high-performance, and independent interconnect.

An example of the present disclosure is an apparatus. The apparatus includes a processing system on a chip, a circuit block on the chip, and a configurable network on the chip. The processing system and the circuit block are connected to the configurable network. The configurable network includes a peripheral interconnect. The peripheral interconnect includes a root node and a plurality of switches. The root node and the plurality of switches are connected in a tree topology. First branches of the tree topology are connected to respective slave endpoint circuits of the configurable network. The slave endpoint circuits of the configurable network are programmable to configure the configurable network.

Another example of the present disclosure is a method for operating an integrated circuit. A first transaction request is received at a root node on a chip from a master circuit on the chip. A second transaction request is transmitted from the root node to a tree topology comprising switches on the chip. The second transaction request corresponds to the first transaction request and comprises a destination identification of a slave endpoint circuit to which the first transaction request is directed. The second transaction request is received at least one switch in the tree topology. For each of the at least one switch that receives the second transaction request, on which subsequent branch of the tree topology to transmit the second transaction request is determined based on the destination identification. For each of the at least one switch that receives the second transaction request, the second transaction request is transmitted on the determined subsequent branch of the tree topology. Each branch of the tree topology is connected to a respective slave endpoint circuit, and at least some of the slave endpoint circuits are configurable components of a configurable network on the chip.

Another example of the present disclosure is an apparatus. The apparatus includes an integrated circuit on a chip. The integrated circuit includes a processing system on the chip, a programmable logic region on the chip, a configuration interconnect on the chip, and a configurable network on the chip. The configuration interconnection is connected between the processing system and the programmable logic region. The processing system is configured to program the programmable logic region via the configuration interconnect. The configurable network is connected to the processing system and the programmable logic region. Programmable components of the configurable network are programmable to provide communication channels through the configurable network. The configurable network includes a peripheral interconnect. The peripheral interconnect includes a root node and switches. The root node and the switches are connected in a tree topology. First branches of the tree topology are connected to the programmable components of the configurable network.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
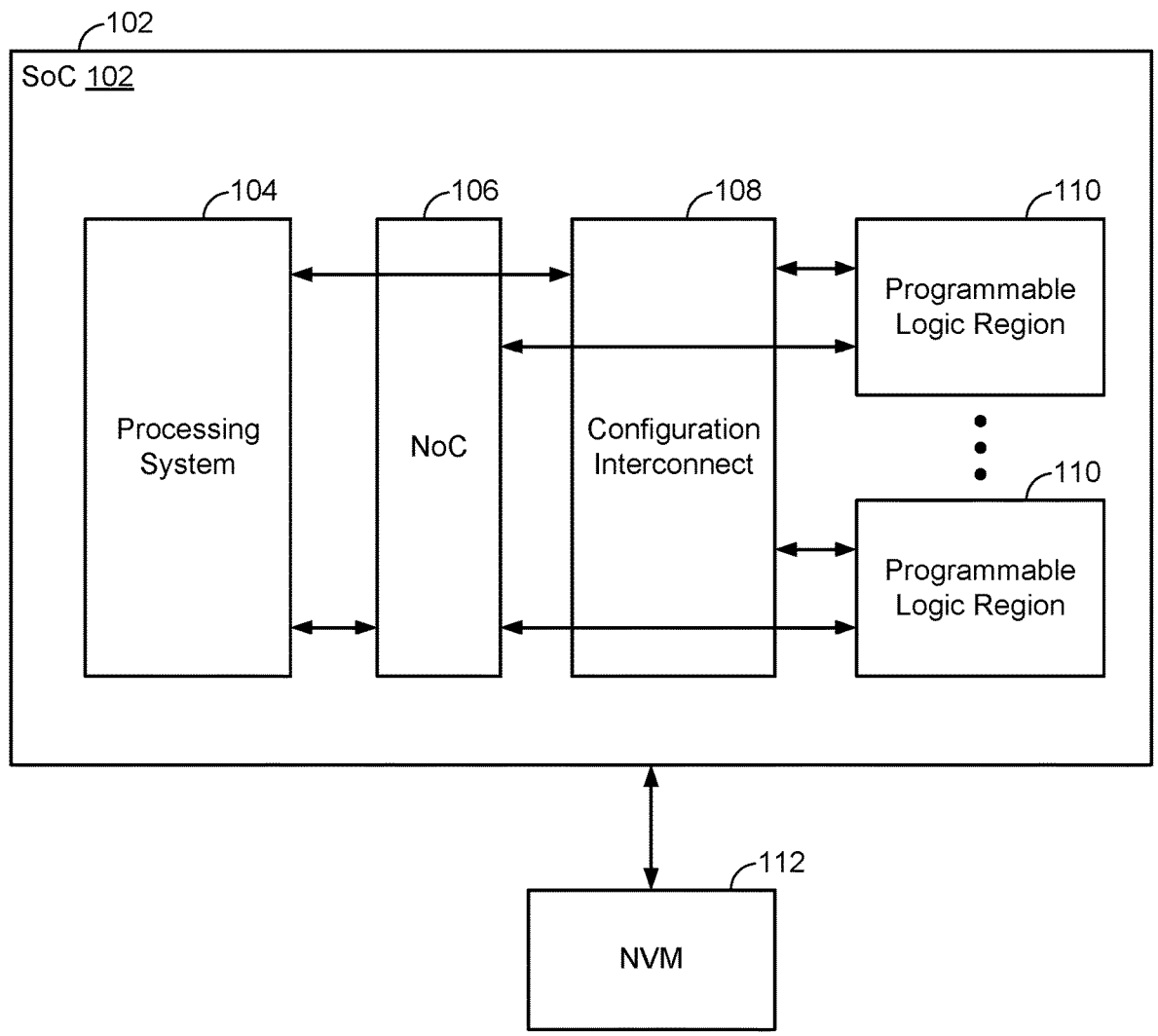
FIG. 1 is a block diagram depicting a system-on-chip (SoC) according to an example.

Examples described herein provide for a peripheral interconnect for configuring slave endpoint circuits in an integrated circuit (IC). In some examples, the slave endpoint circuits include components of a configurable network-on-chip (NoC) and other components, such as in a memory controller, clock generator, etc. The peripheral interconnect can be a distributed, low-overhead, high-performance, and independent interconnect. The peripheral interconnect can be implemented with a tree topology. The slave endpoint circuits can be written and read by implementing memory-mapped transaction requests through the peripheral interconnect.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

FIG. 1 is a block diagram depicting a system-on-chip (SoC) 102 according to an example. The SoC 102 is an integrated circuit (IC) comprising a processing system 104, a network-on-chip (NoC) 106, a configuration interconnect 108, and one or more programmable logic regions 110. The SoC 102 can be coupled to external circuits, such as a nonvolatile memory (NVM) 112. The NVM 112 can store data that can be loaded to the SoC 102 for configuring the SoC 102, such as configuring the NoC 106 and the programmable logic region(s) 110. In general, the processing system 104 is connected to the programmable logic region(s) 110 through the NoC 106 and through the configuration interconnect 108.

The processing system 104 can include one or more processor cores. For example, the processing system 104 can include a number of ARM-based embedded processor cores. The programmable logic region(s) 110 can include any number of configurable logic blocks (CLBs), which may be programmed or configured using the processing system 104 through the configuration interconnect 108. For example, the configuration interconnect 108 can enable, for example, frame-based programming of the fabric of the programmable logic region(s) 110 by a processor core of the processing system 104 (such as a platform management controller (PMC) described further below).

Figure 2:
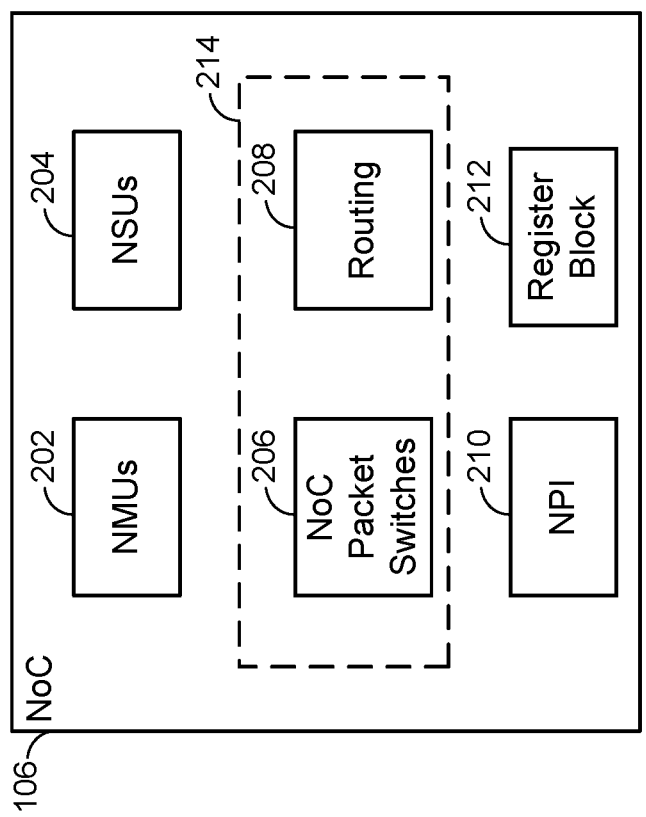
FIG. 2 is a block diagram depicting a network-on-chip (NoC) according to an example.

FIG. 2 is a block diagram depicting the NoC 106 according to an example. The NoC 106 includes NoC master units (NMUs) 202, NoC slave units (NSUs) 204, a network 214, NoC peripheral interconnect (NPI) 210, and register blocks 212. Each NMU 202 is an ingress circuit that connects a master circuit to the NoC 106. Each NSU 204 is an egress circuit that connects the NoC 106 to a slave endpoint circuit. The NMUs 202 are connected to the NSUs 204 through the network 214. In an example, the network 214 includes NoC packet switches 206 and routing 208 between the NoC packet switches 206. Each NoC packet switch 206 performs switching of NoC packets. The NoC packet switches 206 are connected to each other and to the NMUs 202 and NSUs 204 through the routing 208 to implement a plurality of physical channels. The NoC packet switches 206 also support multiple virtual channels per physical channel. The NPI 210 includes circuitry to program the NMUs 202, NSUs 204, and NoC packet switches 206. For example, the NMUs 202, NSUs 204, and NoC packet switches 206 can include register blocks 212 that determine functionality thereof. The NPI 210 includes a peripheral interconnect coupled to the register blocks 212 for programming thereof to set functionality. The register blocks 212 in the NoC 106 support interrupts, QoS, error handling and reporting, transaction control, power management, and address mapping control. The register blocks 212 can be initialized in a usable state before being reprogrammed, such as by writing to the register blocks 212 using write requests as described below. Configuration data for the NoC 106 can be stored in the NVM 112 and provided to the NPI 210 for programming the NoC 106 and/or other slave endpoint circuits.

Figure 3:
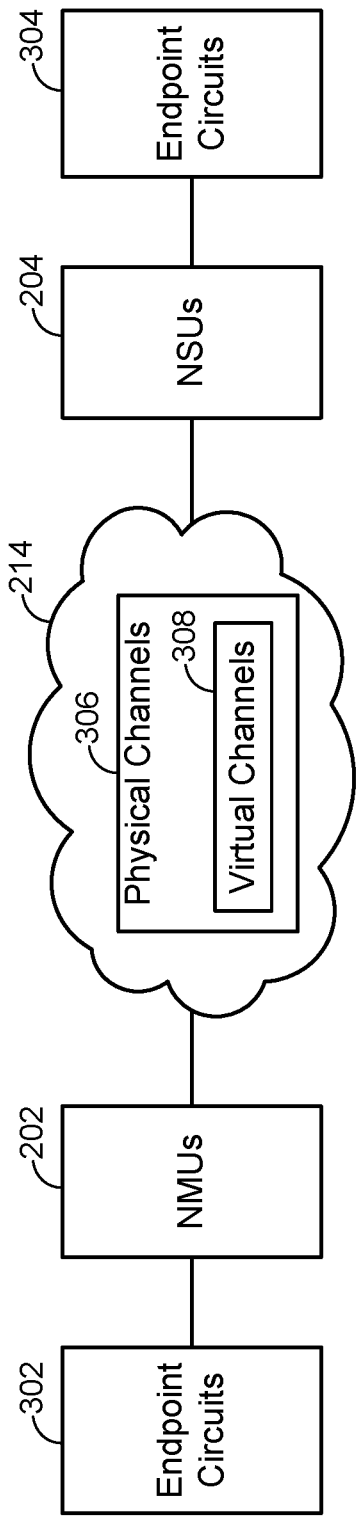
FIG. 3 is a block diagram depicting connections between endpoint circuits through the NoC according to an example.

FIG. 3 is a block diagram depicting connections between endpoint circuits through the NoC 106 according to an example. In the example, endpoint circuits 302 are connected to endpoint circuits 304 through the NoC 106. The endpoint circuits 302 are master circuits, which are coupled to NMUs 202 of the NoC 106. The endpoint circuits 304 are slave circuits coupled to the NSUs 204 of the NoC 106. Each endpoint circuit 302 and 304 can be a circuit in the processing system 104, a circuit in a programmable logic region 110, or a circuit in another subsystem. Each endpoint circuit in the programmable logic region 110 can be a dedicated circuit (e.g., a hardened circuit) or a circuit configured in programmable logic.

The network 214 includes a plurality of physical channels 306. The physical channels 306 are implemented by programming the NoC 106. Each physical channel 306 includes one or more NoC packet switches 206 and associated routing 208. An NMU 202 connects with an NSU 204 through at least one physical channel 306. A physical channel 306 can also have one or more virtual channels 308.

Figure 4:
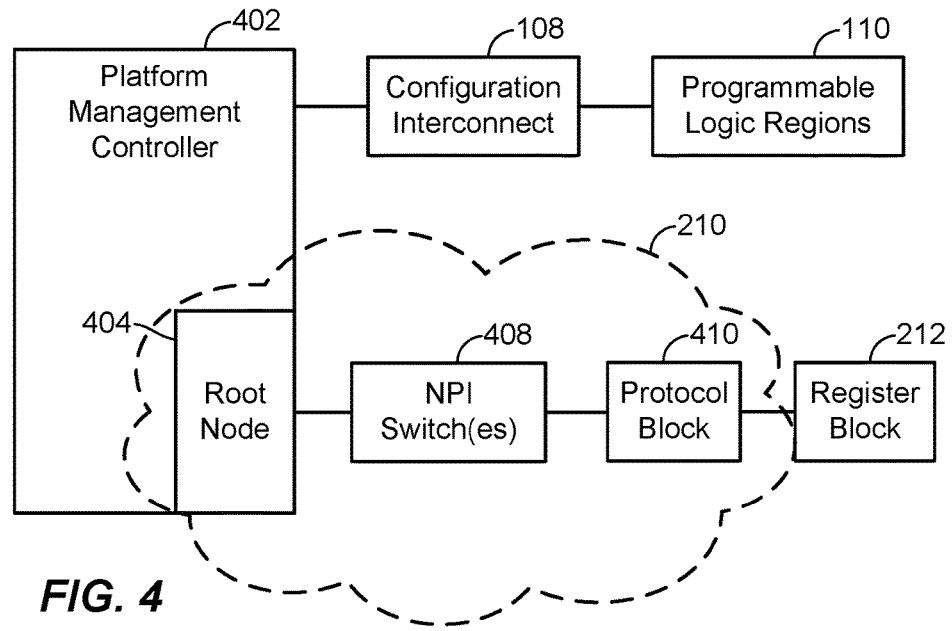
FIG. 4 is a block diagram depicting connections to a register block through a NoC Peripheral Interconnect (NPI) according to an example.

FIG. 4 is a block diagram depicting connections to a register block 212 through the NPI 210 according to an example. To connect to a register block 212, the NPI 210 includes a root node 404, one or more NPI switches 408, and a protocol block 410. The root node 404, in some examples, resides on a platform management controller (PMC) 402, which may further reside in the processing system 104, although in other examples, the root node 404 can be an independent circuit or reside on another system or circuit. Generally, the root node 404 can packetize a transaction request into a format implemented by the NPI 210 and can transmit a memory mapped transaction request to an NPI switch 408, which can further transmit the memory mapped transaction request to other NPI switches 408 or to a protocol block 410. The protocol block 410 can then translate the memory mapped transaction request into a format implemented by the register block 212. The register block 212 is illustrated in FIG. 4 as an example of a slave endpoint circuit to which the NPI 210 can be connected. The NPI 210 can further be connected to other slave endpoint circuits, such as programmable components of a memory controller, temperature sensor, clock generator, etc. The NPI 210 is generally a tree topology as described by the example of FIG. 5.

The PMC 402 is further connected to the configuration interconnect 108, which is in turn connected to the programmable logic regions 110. The PMC 402 is configured to program the fabric of the programmable logic regions 110 through the configuration interconnect 108. The configuration interconnect 108 is a delivery mechanism for programming programmable units on the SoC 102 that is independent of the delivery mechanism of the NPI 210 for programming other programmable units (e.g., slave endpoint circuits) on the SoC 102.

Figure 5:
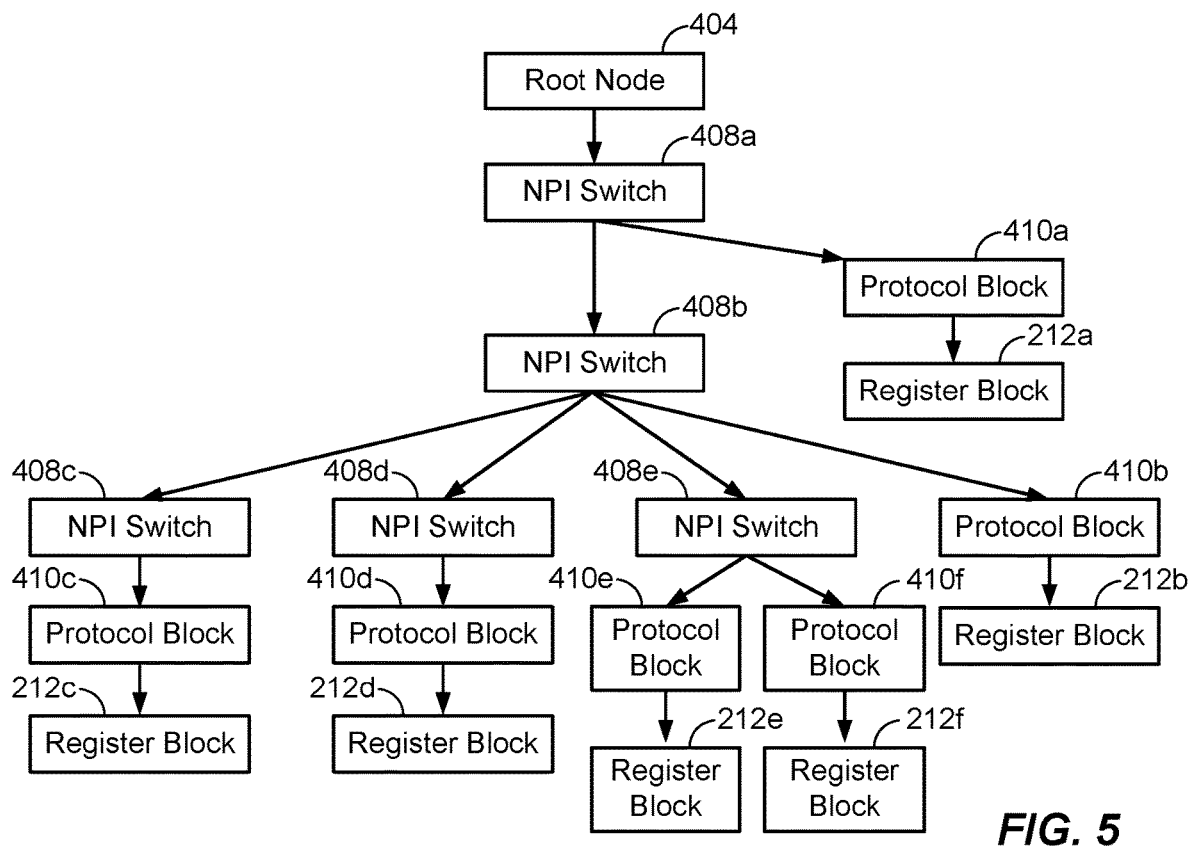
FIG. 5 is a simplified tree topology of the NPI according to an example.

FIG. 5 illustrates a simplified tree topology of the NPI 210 according to an example. Other configurations may be implemented in other examples. The root node 404 is the interface between one or more master circuits on the SoC 102 and the NPI 210. Ends of branches of the tree topology of the NPI 210 are connected to the slave endpoint circuits, such as the register blocks 212 in this example.

The root node 404 can implement an arbitration scheme, such as a round robin scheme, for handling transaction requests received from the one or more master circuits. The root node 404 can further translate between a protocol used by the one or more master circuits and a protocol used by the NPI 210. For example, the one or more master circuits can implement the Advanced eXtensible Interface fourth generation (AXI4) protocol, and the NPI 210 can implement an NPI Protocol. Hence, in such examples, the root node 404 can translate transaction requests and transaction responses between AXI4 and NPI Protocol.

The NPI switches 408 (individually illustrated as NPI switches 408a, 408b, etc.) include one input port and one or multiple (e.g., four) output ports. The respective input port of each NPI switch 408 is connected to an output port of a preceding node (e.g., root node 404 or NPI switch 408) in the tree topology. For example, the input port of the NPI switch 408a is connected to an output port of the root node 404; the input port of the NPI switch 408b is connected to an output port of the NPI switch 408a; the input port of the NPI switch 408c is connected to an output port of the NPI switch 408b; the input port of the NPI switch 408d is connected to an output port of the NPI switch 408b; and the input port of the NPI switch 408e is connected to an output port of the NPI switch 408b. As indicated, output ports of the NPI switches 408 can be connected to input ports of subsequent NPI switches 408 or to subsequent protocol blocks 410 in the tree topology. In the illustrated example, another output port of the NPI switch 408a is connected to an input port of the protocol block 410a; another output port of the NPI switch 408b is connected to an input port of the protocol block 410b; an output port of the NPI switch 408c is connected to an input port of the protocol block 410c; an output port of the NPI switch 408d is connected to an input port of the protocol block 410d; and respective output ports of the NPI switch 408e are connected to input ports of the protocol blocks 410e and 410f. Each output port of the NPI switches 408 can create a subsequent, or downstream, branch of the tree topology of the NPI 210.

As described in a more detailed example below, the upper NPI switch 408a in the tree topology receives transaction requests from the root node 404, and the upper NPI switch 408a and any subsequent NPI switch 408 (e.g., NPI switches 408b, 408c, etc.) direct the transaction requests to subsequent branches of the tree topology of the NPI 210 according to a destination identification of a slave endpoint circuit (e.g., register block 212) indicated in the respective transaction request.

The protocol blocks 410 have an input port connected to an output port of a preceding NPI switch 408, as described previously, and an output port connected to an input port of a subsequent register block 212. In the illustrated example, the output port of the protocol block 410a is connected to the input port of the register block 212a; the output port of the protocol block 410b is connected to the input port of the register block 212b; the output port of the protocol block 410c is connected to the input port of the register block 212c; the output port of the protocol block 410d is connected to the input port of the register block 212d; the output port of the protocol block 410e is connected to the input port of the register block 212e; and the output port of the protocol block 410f is connected to the input port of the register block 212f. The protocol blocks 410 can translate the transaction request from the protocol implemented on the NPI 210 to a protocol implemented by the respective slave endpoint circuit (e.g., register block 212). In some examples, the protocol blocks 410 can translate between NPI Protocol and the Advanced Microcontroller Bus Architecture (AMBA) 3 Advanced Peripheral Bus (APB3) protocol.

As indicated in an example below, the connections between various nodes may be described as between input and output ports; however, such connections can permit bi-directional communications. The description of various input ports and output ports are in the contexts of directionality of a transaction request from a master circuit to a slave endpoint circuit, and such designation as an input port or an output port is merely for convenience. As described below, a transaction response to a transaction request can be transmitted from an input port and received at an output port.

Figure 6:
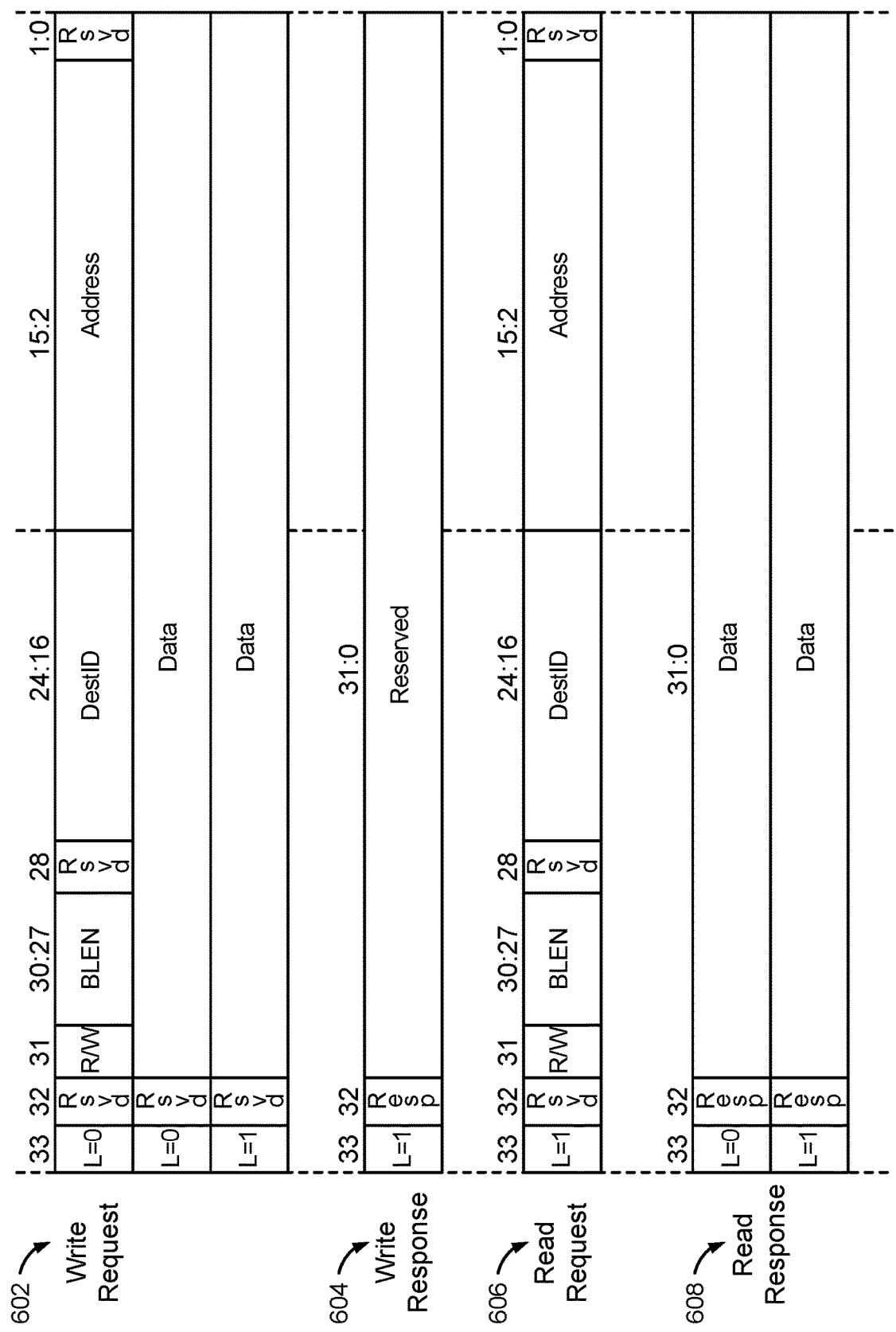
FIG. 6 shows example write and read request and response formats according to an example.

In some examples, the NPI Protocol is implemented by the NPI 210. FIG. 6 illustrates example transaction request and response formats of the NPI Protocol in some examples. FIG. 6 shows an NPI Protocol write request format 602, an NPI Protocol write response format 604, an NPI Protocol read request format 606, and an NPI Protocol read response format 608. In the illustrated examples, the transaction request and response formats implement a data flow-control digit (flit). A transaction request or response can include any number of data flits, where a last signal indication can indicate whether a subsequent data flit will follow the data flit containing the last signal indication, or the data flit containing the last signal indication is the last data flit of the transaction request or response. In the illustrated example, each of the formats 602, 604, 606, and 608 implement one or more data flits that are each thirty-four bits [33:0] in length, although other examples, any number of bits may be implemented in a data flit.

The NPI Protocol write request format 602 includes at least two data flits, and as illustrated, includes three data flits. The first data flit is a header data flit and is formatted as follows:
  (1) Least significant two bits [1:0]— reserved or do not care
  (2) Bits [15:2]— Destination Address
  (3) Bits [24:16]— Slave Destination Identification (ID)
  (4) Bit [28]— reserved or do not care
  (5) Bits [30:27]— Burst Length (BLEN) of data flits containing data to be written
  (6) Bit [31]— Read/Write Indication (Write)
  (7) Bit [32]— reserved or do not care
  (8) Most significant bit [33]— Last signal indication (0 for at least one subsequent data flit to follow)
The subsequent data flits are formatted as follows:
  (1) Least significant thirty-two bits [31:0]— Data to be written
  (2) Bit [32]— reserved or do not care
  (3) Most significant bit [33]— Last signal indication (0 for at least one subsequent data flit to follow, or 1 for last data flit)

The NPI Protocol write response format 604 includes one data flit that is formatted as follows:
  (1) Least significant thirty-two bits [31:0]— reserved or do not care
  (2) Bit [32]— Response (1 for success, 0 for error)
  (3) Most significant bit [33]— Last signal indication (1 for last data flit)

The NPI Protocol read request format 606 includes one data flit that is formatted as follows:
(1) Least significant two bits [1:0]— reserved or do not care
(2) Bits [15:2]— Destination Address
(3) Bits [24:16]— Slave Destination ID
(4) Bit [28]— reserved or do not care
(5) Bits [30:27]— Burst Length (BLEN) of data flits containing data to be written
(6) Bit [31]— Read/Write Indication (Read)
(7) Bit [32]— reserved or do not care
(8) Most significant bit [33]— Last signal indication (1 for last data flit)

The NPI Protocol read response format 608 includes one or more data flits, where each data flit is formatted as follows:
(1) Least significant thirty-two bits [31:0]— Data that is read
(2) Bit [32]— Response (1 for success, 0 for error)
(3) Most significant bit [33]— Last signal indication (0 for at least one subsequent data flit to follow, or 1 for last data flit)

Some example data flows are described in the context of the tree topology of FIG. 5 and the NPI Protocol transaction request and response formats of FIG. 6, according to some examples. The SoC 102 can include, for example, 512 slave endpoint circuits to and/or from which the NPI 210 can write and/or read, and hence, the NPI 210 can be connected to 512 register blocks 212 or other slave endpoint circuits. The 512 slave endpoint circuits (e.g., register blocks 212) is reflected in this example by the nine bits [24:16] of the NPI Protocol write request format 602 and the NPI Protocol read request format 606. Each register block 212 can include a configuration address space, such as 64 KB, that is addressable by the destination address, such as bits [15:2], of the NPI Protocol write request format 602 and the NPI Protocol read request format 606. The configuration address space can be contiguous or non-contiguous for any register block 212. Address space of multiple register blocks 212 can be grouped together. The slave endpoint circuits can be, for example, components of the NoC 106 (such as the NoC packet switches 206, NMUs 202, and NSUs) or other components in the SoC 102 (such as components in a memory controller, clock generator, temperature sensor, etc.).

Each NPI switch 408 can perform an autodiscovery scheme to identify which slave endpoint circuit is below or connected to which output port of the respective NPI switch 408, and the root node 404 has a mapping from upper address bits to a Destination ID of a slave endpoint circuit. The root node 404 is configured to translate an address of a slave endpoint circuit of a transaction request received from a master circuit into a Destination ID and a Destination Address by converting the upper bits of the address of the received transaction request into the Destination ID while maintaining the lower sixteen bits of the address of the received transaction request for the Destination Address. The root node 404 translates the received transaction request into an NPI Protocol transaction request that is in the NPI Protocol write request format 602 or the NPI Protocol read request format 606. The root node 404 then transmits the NPI Protocol transaction request to a first NPI switch 408 in the tree topology (e.g., NPI switch 408a). The first NPI switch 408 determines on which output port to transmit the NPI Protocol transaction request based on the Destination ID of the NPI Protocol transaction request. If the first NPI switch 408 determines that the slave endpoint circuit with the Destination ID is below, for example, the second output port and not the first output port of the first NPI switch 408, the first NPI switch 408 transmits the NPI Protocol transaction request on the second output port. Each subsequent NPI switch 408 that receives the NPI Protocol transaction request makes a similar determination based on the Destination ID of the NPI Protocol transaction request and transmits the NPI Protocol transaction request on the output port below which is the slave endpoint circuit designated by the Destination ID until the protocol block 410 corresponding to that slave endpoint circuit receives the NPI Protocol transaction request. The protocol block 410 then translates the NPI Protocol transaction request to the protocol implemented by the slave endpoint circuit and transmits the translated transaction request to the designated slave endpoint circuit.

Once the slave endpoint circuit has received the translated transaction request, the slave endpoint circuit transmits a transaction response back towards the root node 404. The protocol block 410 is configured to translate the transaction response of the slave endpoint circuit into an NPI Protocol transaction response that is in the NPI Protocol write response format 604 or the NPI Protocol read response format 608. The protocol block 410 then transmits the NPI Protocol transaction response to the NPI switch 408 to which the input port of the protocol block 410 is connected in the tree topology. Each NPI switch 408 that receives the NPI Protocol transaction response at an output port then transmits the NPI Protocol transaction response up the tree topology by transmitting the NPI Protocol transaction response through its input port. The NPI Protocol transaction response propagates up the tree topology to the root node 404, which translates the NPI Protocol transaction response to a translated response that is then transmitted to the appropriate master circuit.

The root node 404 is further configured to handle multiple transaction requests received from master circuits. If the root node 404 receives multiple transaction requests from master circuits simultaneously, the root node 404 implements an arbitration scheme, such as a round robin scheme, and serializes the transaction requests accordingly. If the root node 404 receives multiple transaction requests from master circuits simultaneously and/or over a short period, the root node 404 can serialize and buffer the transaction requests in a buffer, such as a first-in-first-out (FIFO) buffer. The root node 404 can translate the transaction requests in a serial manner and can subsequently transmit data flits in bursts, for example. A single data flit may be an NPI Protocol transaction request, or multiple data flits may compose an NPI Protocol transaction request, which may be transmitted in a burst. The root node 404 transmits the data flits in a pipelined manner to the first NPI switch 408 of the tree topology (e.g., NPI switch 408a).

The NPI switches 408 handle the first received NPI Protocol transaction request, with its n number of data flits, as described above. The NPI switches 408 will continue to propagate data flits (e.g., of the first and/or subsequent NPI Protocol transaction requests) following the first data flit of the first received NPI Protocol transaction request until: (i) an NPI switch 408 determines that a subsequently received NPI Protocol transaction request is to be transmitted on an output port of the NPI switch 408 on which the first received NPI Protocol transaction request was not transmitted, and (ii) that NPI switch 408 has not received an NPI Protocol transaction response from the slave endpoint circuit to which the first received NPI Protocol transaction request was transmitted. Stated differently, the NPI switches 408 do not transmit an NPI Protocol transaction request down a branch of the tree topology different from a branch where another previous NPI Protocol transaction request is currently pending. If an NPI switch 408 receives an NPI Protocol transaction request to be transmitted on an output port different from an output port where a previous NPI Protocol transaction request was transmitted and the NPI switch 408 has not received an NPI Protocol transaction response for the previous NPI Protocol transaction request, the NPI switch 408 blocks further propagation of any data flit from that NPI switch 408 and, in some examples, from upstream nodes, until an NPI Protocol transaction response to all respective previous NPI Protocol transaction requests have been received by the NPI switch 408. The NPI switch 408 can block propagation of any data flit received by the NPI switch 408 and, in some examples, any preceding NPI switch 408 and root node 404 in the tree topology. Once the appropriate NPI switch 408 receives an NPI Protocol transaction response for each previous NPI Protocol transaction request, the NPI switch 408 can terminate blocking propagation of any data flit, and propagation of data flits through the NPI switches 408 may resume.

To further illustrate the example, assume that a first master circuit transmits a write request for ninety-six bits of data at some address located in register block 212*f*, and that a second master transmits a read request for sixty-four bits of data at some address located in register block 212*a*. Further, assume that the root node 404 receives the write request one clock cycle before the root node 404 receives the read request, or that the root node 404 receives the write request and read request simultaneously and determines that the write request has priority over the read request according to the arbitration scheme. Hence, the root node 404 handles and serializes the write request before the read request.

The root node 404 translates the received write request according to the NPI Protocol write request format 602 to an NPI Protocol write request. The NPI Protocol write request is composed of four data flits, where (i) the first header data flit includes the Destination ID of the register block 212*f*, the Destination Address to be written, the burst length of three data flits (e.g., three write-data data flits), an indication of a write request, and an indication that the data flit is not the last signal; and (ii) the second through fourth data flits include data to be written with the second and third data flits having an indication that the respective data flit is not the last signal, and the fourth data flit having an indication that the data flit is the last signal. The root node 404 transmits the header data flit at a clock cycle and the three subsequent write-data data flits at respective subsequent clock cycles. The root node 404 places the received write request in a FIFO buffer pending a response to the NPI Protocol write request.

The root node 404 then translates the received read request according to the NPI Protocol read request format 606 to an NPI Protocol read request. The NPI Protocol read request is composed of one data flit including the Destination ID of the register block 212*a*, the Destination Address to be read, the burst length of two data flits (e.g., two read-data data flits), an indication of a read request, and an indication that the data flit is the last signal. The root node 404 transmits the data flit of the NPI Protocol read request at a clock cycle following the transmission of the last data flit of the NPI Protocol write request. The root node 404 places the received read request in the FIFO buffer pending a response to the NPI Protocol read request. Hence, the write request precedes the read request in the FIFO buffer.

Referring back to the NPI Protocol write request, the NPI switch 408*a* receives the header data flit at the first clock cycle. The NPI switch 408*a* determines from the header data flit that the Destination ID corresponds with a slave endpoint circuit below a first output port, and hence, the NPI switch 408*a* transmits the header data flit through the first output port to the NPI switch 408*b* at the next clock cycle. The NPI switch 408*a* continues to transmit data flits at respective clock cycles through the first output port until transmitting a data flit that includes an indication that that data flit is the last signal of the NPI Protocol write request. Similarly, the NPI switch 408*b* receives the header data flit at the second clock cycle. The NPI switch 408*b* determines from the header data flit that the Destination ID corresponds with a slave endpoint circuit below a third output port, and hence, the NPI switch 408*b* transmits the header data flit through the third output port to the NPI switch 408*e* at the next clock cycle. The NPI switch 408*b* continues to transmit data flits at respective clock cycles through the third output port until transmitting a data flit that includes an indication that that data flit is the last signal of the NPI Protocol write request. Further, the NPI switch 408*e* receives the header data flit at the third clock cycle. The NPI switch 408*e* determines from the header data flit that the Destination ID corresponds with a slave endpoint circuit below a second output port, and hence, the NPI switch 408*e* transmits the header data flit through the second output port to the protocol block 410*f* at the next clock cycle. The NPI switch 408*e* continues to transmit data flits at respective clock cycles through the second output port until transmitting a data flit that includes an indication that that data flit is the last signal of the NPI Protocol write request. After four clock cycles, the header data flit of the NPI Protocol write request has been received at the protocol block 410*f* (which then translates the NPI Protocol write request and forwards the translated write request to the register block 212*f*); the first write-data data flit has been received at the NPI switch 408*e*; the second write-data data flit has been received at the NPI switch 408*b*; and the third write-data data flit has been received at the NPI switch 408*a*.

The NPI switch 408*a* receives the data flit of the NPI Protocol read request at the fifth clock cycle, and the data flits of the NPI Protocol write request continue to propagate down the branch of NPI switches 408*b*, 408*e*. The NPI switch 408*a* determines from the data flit of the NPI Protocol read request that the Destination ID corresponds with a slave endpoint circuit below a second output port. However, the NPI switch 408*a* maintains, e.g., in a buffer, that an NPI Protocol transaction request—the NPI Protocol write request—has been transmitted through the first output port of the NPI switch 408*a*, and that the NPI switch 408*a* has not received an NPI Protocol transaction response to that NPI Protocol transaction request. Hence, the NPI switch 408*a* implements blocking of the propagation of data flits at the NPI switch 408*a* (e.g., the NPI switch 408*a* does not transmit the data flit of the NPI Protocol read request). The NPI switch 408*a* (and in some examples, any upstream NPI switches 408 and the root node 404) remains blocked until the NPI switch 408*a* receives an NPI Protocol write response to the NPI Protocol write request. During this blocked state, NPI switches 408 downstream of the NPI switch 408*a*, such as NPI switches 408*b*, 408*e*, can continue propagating data flits, unless a branching and corresponding blocking condition arises at a downstream NPI switch 408, for example.

After seven clock cycles, the four data flits have been transmitted to and received by the protocol block 410*f*;

which translates the NPI Protocol write request into a format that is implemented by the register block 212f. The register block 212f thereafter processes the translated write request and transmits a write response to the translated write request to the protocol block 410f, which translates the write response according to the NPI Protocol write response format 604 to an NPI Protocol write response. The NPI Protocol write response is composed of one data flit including an indication whether the writing in the register block 212f was successful and an indication that the data flit is the last signal. The data flit of the NPI Protocol write response can then be transmitted back upstream through the NPI switches 408e, 408b, 408a to the root node 404, such as synchronously or asynchronously.

Upon receipt of the NPI Protocol write response at the NPI switch 408a, the NPI switch 408a terminates blocking transmission of data flits from the NPI switch 408a (and in some examples, any upstream NPI switch 408a and the root node 404). Hence, the NPI switch 408a transmits the data flit of the NPI Protocol read request through the second output port to the protocol block 410a at the next clock cycle. The protocol block 410a translates the NPI Protocol read request into a format that is implemented by the register block 212a. The register block 212a thereafter processes the translated read request and transmits a read response to the translated read request to the protocol block 410a, which translates the read response according to the NPI Protocol read response format 608 to an NPI Protocol read response. The NPI Protocol read response is composed of two data flits, with each including read data and an indication whether that the respective data flit is the last signal. The data flits of the NPI Protocol read response can then be transmitted back upstream through the NPI switch 408a to the root node 404, such as synchronously or asynchronously.

As a result of the serialization of NPI Protocol transaction requests by the root node 404 and the blocking by NPI switches 408 when branching occurs, NPI Protocol transaction responses to NPI Protocol transaction requests are received by the root node 404 in the order that the root node 404 transmits the NPI Protocol transaction requests to the NPI switches 408. Hence, the root node 404 is capable of maintaining a FIFO buffer of transaction requests received from master circuits and transmitting corresponding transaction responses to the master circuits for those transaction requests based on the order of the NPI Protocol transaction responses received by the root node 404. For example, in the above described example, the root node 404 transmits a transaction response to the first master circuit based on the received NPI Protocol write response before the root node 404 transmits a transaction response to the second master circuit based on the received NPI Protocol read response. Further, due to the serialization and possible blocking of transaction requests, the root node 404 may transmit responses to master circuits before transmitting the transaction requests to the tree topology, as described in further detail below.

In some examples, serial NPI Protocol transaction requests to a common slave endpoint circuit may not be blocked by NPI switches 408. In such a situation, the propagation of data flits of the NPI Protocol transaction requests do not create a branch situation at an NPI switch 408. The slave endpoint circuit may process and transmit a transaction response to each NPI Protocol transaction request sequentially received. In some examples, the last NPI switch 408 to the slave endpoint circuit may initiate blocking, such as to permit the slave endpoint circuit sufficient time to process the previous transaction request when the slave endpoint circuit does not include a buffer for the transaction requests.

A benefit of implementing an NPI as described in the foregoing examples includes optimizing write and sequential read requests. Suppose a master circuit transmits a write request to write data into a given address of a slave endpoint circuit. The master circuit may thereafter, such as in the immediately following clock cycle, transmit a read request to read the data from that given address of the slave endpoint circuit. The serialization of these two transactions by the root node 404, for example, permits the propagation of the subsequent read request through various NPI switches 408 before the root node 404 and master circuit receives a response to the write request. Hence, the read request can be propagated to some node or block in the NPI 210 before the write request is processed or completed.

Figure 7A:
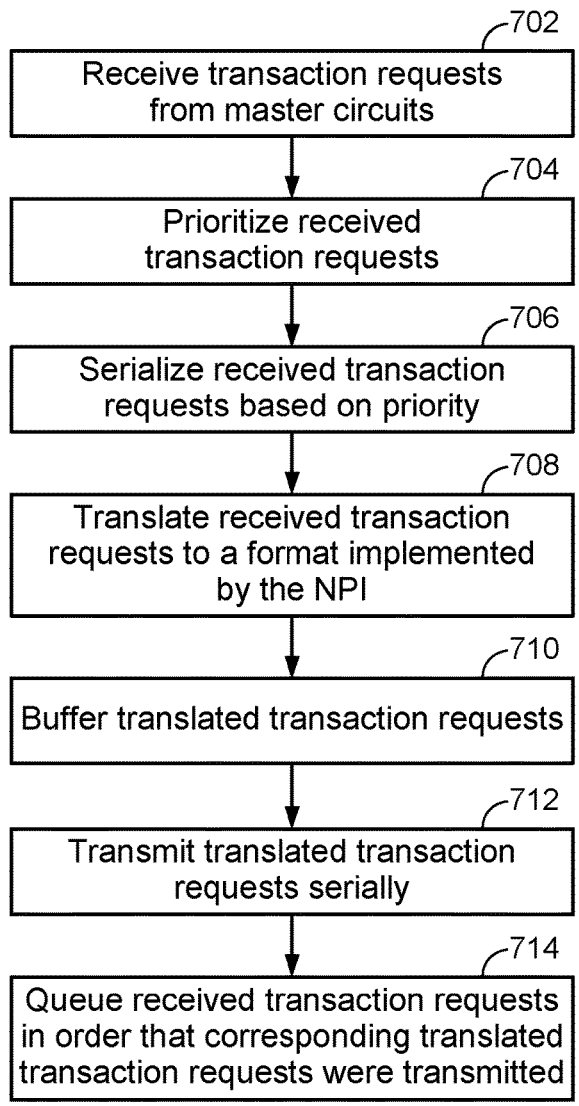
FIGS. 7A and 7B are flow charts of operations of a root node of an NPI according to some examples.
Figure 7B:
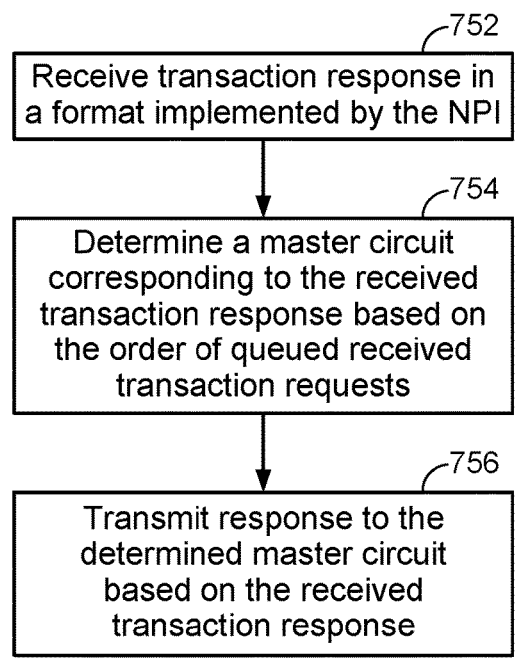

FIGS. 7A and 7B are flow charts of operations of the root node 404 according to some examples. FIG. 7A is a flow chart for handling a received transaction request by the root node 404, and FIG. 7B is a flow chart for handling a received transaction response by the root node 404.

Referring to FIG. 7A, in block 702, the root node 404 receives one or more transaction requests from one or more master circuits. In block 704, the root node 404 prioritizes the received transaction requests. For example, transaction requests that are received sequentially are prioritized in the order the transaction requests are received, and transaction requests that are received simultaneously (e.g., at a same clock cycle) undergo arbitration according to an arbitration scheme, such as a round robin arbitration scheme, implemented by the root node 404 to determine priority of the transaction requests received simultaneously. In block 706, the root node 404 serializes the received transaction requests according to the priority assigned to the respective transaction requests in block 704. In block 708, the root node 404 translates the received transaction requests to a format implemented by the NPI, such as the NPI Protocol write request format 602 and the NPI Protocol read request format 606 of FIG. 6.

In block 710, optionally, the root node 404 buffers the translated transaction requests, for example, in a FIFO buffer. The translated transaction request may be buffered in block 710 when the subsequent NPI switch 408 of the tree topology has de-asserted a ready to receive signal, as described subsequently. In block 712, the root node 404 transmits the translated transaction requests serially to the subsequent NPI switch 408 of the tree topology. The root node 404 transmits translated transaction requests, e.g., stored in the buffer first in the order that the translated transaction requests were stored (e.g., FIFO), and then, transmits subsequently translated transaction requests. Hence, the root node 404 transmits the translated transaction requests serially in the order that the received transaction requests were serialized in block 706. In addition to transmitting the translated transaction requests in a serialized order, the root node transmits one data flit per clock cycle, in some examples. A single data flit can compose a translated transaction request, and/or multiple consecutively transmitted data flits can compose a translated transaction request.

In block 714, the root node 404 queues the received transaction requests in the order that the respective corresponding translated transaction requests were transmitted to the subsequent NPI switch 408 of the tree topology. The queue can be implemented by pushing to a FIFO buffer, for example. The queue maintains received transaction requests that have been processed and transmitted by the root node 404 so the root node 404 can send transaction responses back to the corresponding master circuits when the root node 404 receives corresponding transaction responses. As described above, serialization and blocking of transaction requests through the tree topology can cause received responses to be in the order that the transaction requests were transmitted, and hence, a received transaction response can correspond to a head entry in a FIFO buffer.

The operations of the root node 404 illustrated in FIG. 7A assume that the subsequent NPI switch 408 of the tree topology has asserted a ready to receive signal. In some examples, the NPI switches 408 of the tree topology assert a ready to receive signal in a default state, and are capable of de-asserting the ready to receive signal under certain conditions, such as when the subsequent NPI switch 408 has insufficient storage space. As described above, if the subsequent NPI switch 408 of the tree topology de-asserts the ready to receive signal, the root node 404 may buffer translated transaction requests as shown in block 710 to thereby continue receiving and processing transaction requests in blocks 702-708.

Referring to FIG. 7B, in block 752, the root node 404 receives from the subsequent NPI switch 408 in the tree topology a transaction response in a format implemented by the NPI. In block 754, the root node 404 determines which master circuit corresponds to the received transaction response based on the order of the queued received transaction requests in block 714 of FIG. 7A. For example, the root node 404 can pop an entry from the FIFO buffer and determine which master circuit transmitted the transaction request to the root node 404 since ordering of the transaction requests and transaction responses can be maintained by serialization and blocking as described above. In block 756, the root node 404 transmits a transaction response to the determined master circuit based on the received transaction response. The root node 404 can create the transaction response to be in a format implemented by the determined master circuit.

In other examples, the root node 404 can transmit a response to a master circuit upon the transaction request received from the master circuit being serialized in block 706 of FIG. 7A. By merging transaction requests by the serialization, ordering of the transaction requests can be maintained. Hence, the root node 404 can respond to a master circuit before even transmitting the transaction request to the tree topology. This can avoid delay that could occur due to waiting, by a master circuit, for a response to a transaction request before transmitting another transaction request. For example, a master can send a write request to a location, the root node 404 can receive and serialize the write request, and the root node 404 can transmit a response to the master circuit before the root node 404 transmits the write request to the tree topology. Further, the master circuit, upon receiving the response from the root node 404, can transmit a read request of the same location, even if that read request is transmitted from the master circuit before the root node 404 transmits the write request to the location, since the serialization and blocking can ensure that the location is written appropriately before the location is subsequently read.

The order of operations in these flow charts are merely examples, and various operations can be implemented in different logical orders. A person having ordinary skill in the art will readily understand different orders of operations that may be implemented in other examples and any modifications to the flow charts of FIGS. 7A and 7B to implement those different orders. For example, the translation of block 708 may be implemented at any point before the transmission of the translated transaction request of block 712, and, for example, any of the prioritization of block 704, serialization of block 706, buffering of block 710, and queueing of block 714 may be performed on the received transaction request or the translated transaction request. Further, a person having ordinary skill in the art will understand that the operations of FIGS. 7A and 7B may be performed in parallel for different transaction requests and transaction responses, such as in pipelined processing. Various buffers may be implemented to accommodate pipelined or other processing, for example.

Figure 8A:
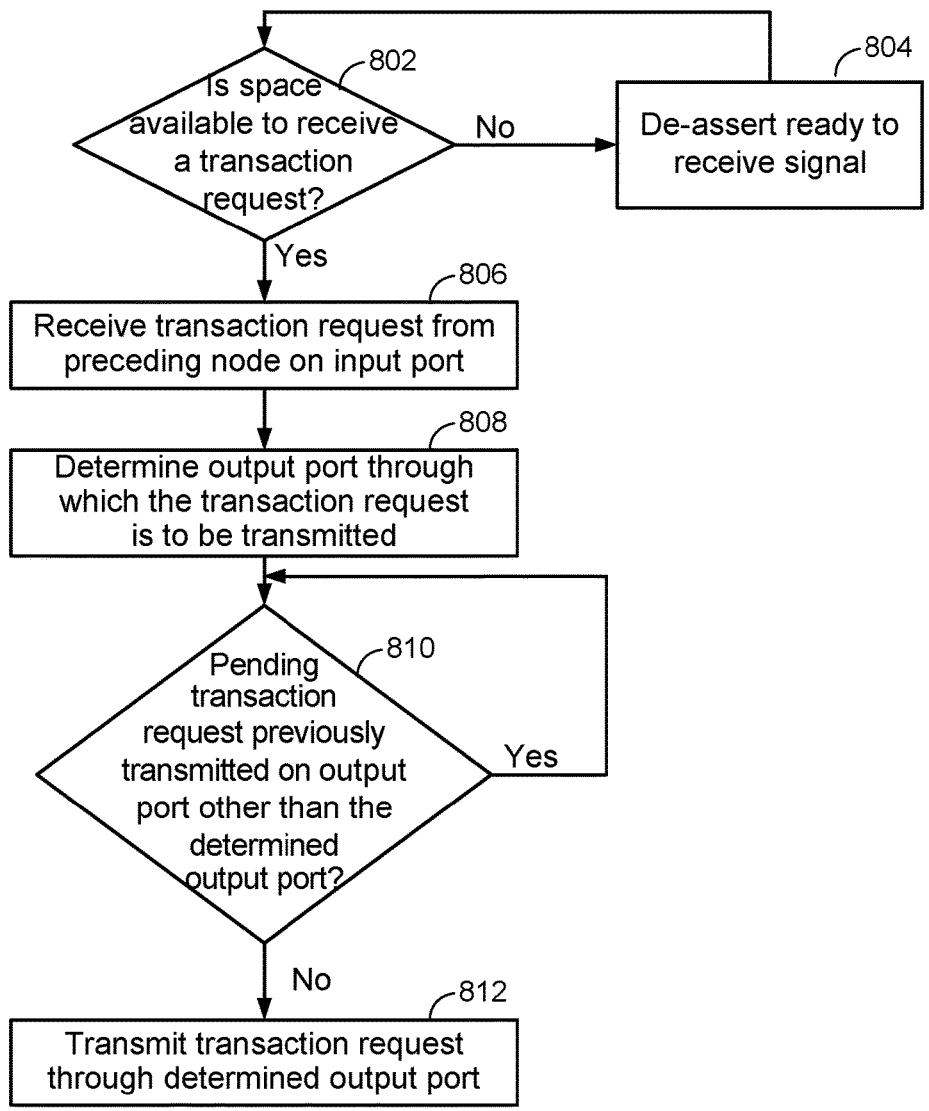
FIGS. 8A and 8B are flow charts of operations of an NPI switch of an NPI according to some examples.
Figure 8B:
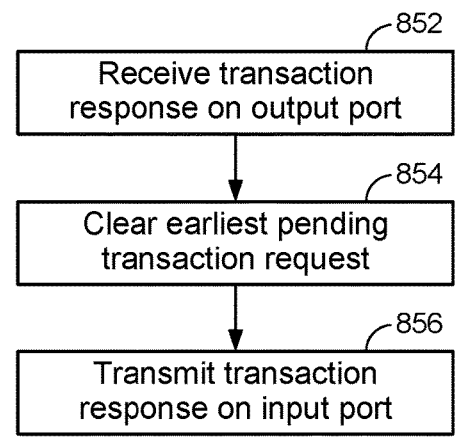

FIGS. 8A and 8B are flow charts of operations of an NPI switch 408 according to some examples. FIG. 8A is a flow chart for handling a received transaction request by an NPI switch 408, and FIG. 8B is a flow chart for handling a received transaction response by an NPI switch 408.

As described further below, each NPI switch 408 includes a 1-to-N buffer that can be implemented to receive and transmit transaction requests. Generally, one or more buffer, e.g., a FIFO buffer, can be implemented to store received transaction requests that are waiting processing and transmission. Further, one or more other buffer, e.g., a FIFO buffer, can be implemented to store transmitted transaction requests that are pending and awaiting a transaction response. The buffer(s) can be implemented to maintain serialization of the transaction requests.

Referring to FIG. 8A, in block 802, the NPI switch 408 determines whether space is available to receive a transaction request. The space available to receive the transaction request can be in a buffer, as stated above, to store a received transaction request as it waits processing and transmission. If space is available, a ready to receive signal is asserted, which may be a default state, as stated above with respect to FIG. 7A. If space is not available, the NPI switch 408 de-asserts the ready to receive signal, which prevents the immediately preceding node (e.g., an NPI switch 408 or root node 404) from transmitting a transaction request. Blocks 802 and 804 may loop until space becomes available to receive a transaction request, at which point, the ready to receive signal may be asserted if the signal was de-asserted.

In block 806, the NPI switch 408 receives a transaction request from an immediately preceding node (e.g., an NPI switch 408 or root node 404) in the tree topology on the input port of the NPI switch 408. Upon receipt, the NPI switch 408 may store the received transaction request in a FIFO buffer for processing and subsequent transmission. In block 808, the NPI switch 408 determines through which output port of the NPI switch 408 the transaction request is to be transmitted. The NPI switch 408 may determine the output port by identifying the output port based on a Destination ID of the slave endpoint circuit in the transaction request as previously described. In block 810, the NPI switch 408 determines whether a pending transaction request was previously transmitted on an output port other than the determined output port.

If no pending transaction request was previously transmitted on an output port other than the determined output port, in block 812, the NPI switch 408 transmits the transaction request through the determined output port to the immediately subsequent node (e.g., NPI switch 408 or protocol block 410), which may include transmitting multiple data flits of the transaction request at respective clock cycles until a data flit containing a last signal indication has been transmitted. Upon transmission, the NPI switch 408 may pop the received transaction request from the FIFO buffer in which it was stored and store (or push) the transmitted transaction request in another FIFO buffer. By popping the received transaction request from the FIFO buffer in which it was stored, space may become available in the FIFO buffer for subsequent receipt of another transaction request.

The stored transmitted transaction requests can indicate pending transaction requests that were previously transmitted for the determination in block 810. Referring back to block 810, the determination may refer to the Destination ID of any previously transmitted transaction requests that are stored. If there are no stored transmitted transaction requests, the determination of block 810 is negative, and the transaction request is transmitted in block 812. If there are stored transmitted transaction requests and the destination of any of the stored transmitted transaction requests (e.g., a first or last pending request) indicates that those requests were transmitted on an output port of the NPI switch 408 that is the same as the determined output port that is determined in block 806, the determination of block 810 is negative, and the transaction request is transmitted in block 812. If there are stored transmitted transaction requests and the destination of any of the stored transmitted transaction requests (e.g., a first or last pending request) indicates that those request were transmitted on an output port of the NPI switch 408 that is different from the determined output port that is determined in block 806, the determination of block 810 is positive, and the transaction request is not transmitted. In such a scenario, the determination of block 810 can continue to loop until the determination is negative. The clearing of pending transaction requests, which can cause the determination to become negative, is described in more detail with respect to FIG. 8B.

A positive determination at block 810 indicates a branching condition. By blocking transmission of a transaction request when a branching condition occurs by operation of the determination of block 810 and subsequent looping, serialization of transaction requests can be maintained, which in turn, can maintain proper serialization of transaction responses.

Referring to FIG. 8B, in block 852, the NPI switch 408 receives a transaction response on an output port. In block 854, the NPI switch 408 clears the earliest pending transaction request. For example, the NPI switch 408 can pop the stored transmitted transaction request in the FIFO buffer that is the earliest pending transmitted transaction request. By clearing a pending transmitted transaction request, a branching condition at the NPI switch 408 may be removed (e.g., by clearing a condition that results in a positive determination in block 810). In block 856, the NPI switch 408 transmits the transaction response to the immediately preceding node (e.g., NPI switch 408 or root node 404) on the input port of the NPI switch 408.

In the described example of FIGS. 8A and 8B, the NPI switch 408 may continue receiving transaction requests when a branching condition occurs as determined in block 810. The received transaction requests can be stored in the appropriate FIFO buffer until no space is available for storing received transaction requests in that FIFO buffer. During the branching condition, no transaction requests are transmitted, and hence, no received transaction requests are popped from the FIFO buffer that stores the received transaction requests. This can lead to the FIFO buffer becoming full and no space being available for storing received transaction requests. Once no space is available for storing received transaction requests, the ready to receive signal is de-asserted in block 804, and the NPI switch 408 does not receive further transaction requests from the preceding node.

In this example, therefore, transaction requests may be propagated through the tree topology until reaching a branching condition in the tree topology and until available space for storing received transaction requests has become full. This can reduce delay by continuing propagating transaction requests as far as maintaining serialization can permit.

In other examples, once a branching condition occurs in the tree topology, a signal can be asserted or de-asserted that indicates to preceding nodes in the tree topology and to the root node 404 that the branching condition has occurred and to block any transmission of transaction requests in the tree topology.

The order of operations in these flow charts are merely examples, and various operations can be implemented in different logical orders. A person having ordinary skill in the art will readily understand different orders of operations that may be implemented in other examples and any modifications to the flow charts of FIGS. 8A and 8B to implement those different orders. Further, a person having ordinary skill in the art will understand that the operations of FIGS. 8A and 8B may be performed in parallel for different transaction requests and transaction responses, such as in pipelined processing. Various buffers may be implemented to accommodate pipelined or other processing, for example. For example, an NPI switch 408 can implement buffers to receive a transaction request in block 806 and transmit another transaction request in block 812 in a same clock cycle.

Figure 9:
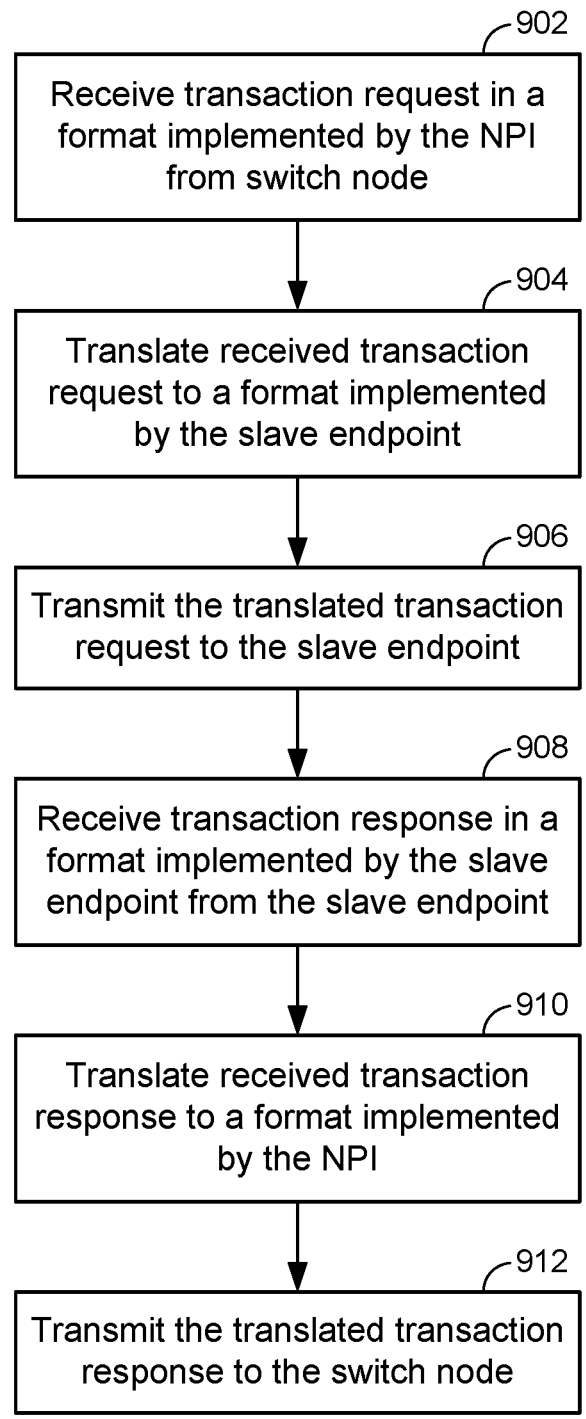
FIG. 9 is a flow chart of an operation of a protocol block of an NPI according to some examples.

FIG. 9 is a flow chart of an operation of a protocol block 410 according to some examples. In block 902, the protocol block 410 receives a transaction request in a format implemented by the NPI (e.g., the NPI Protocol write request format 602 and NPI Protocol read request format 606 of FIG. 6) from the preceding NPI switch 408 in the tree topology. In block 904, the protocol block 410 translates the received transaction request to a format implemented by the slave endpoint circuit (e.g., according to the APB3 protocol). In block 906, the protocol block 410 transmits the translated transaction request to the slave endpoint circuit. The translation and transmission of blocks 904 and 906, respectively, can be performed on a per data flit basis and/or per transaction request basis. For example, if a transaction request is three data flits, the protocol block 410 can implement a buffer for storing received data flits until the entire transaction request is received, and the protocol block 410 can then translate the entire transaction request.

In block 908, the protocol block 410 receives a transaction response in a format implemented by the slave endpoint circuit from the slave endpoint circuit. In block 910, the protocol block 410 translates the received transaction response to a format implemented by the NPI (e.g., the NPI Protocol write response format 604 and NPI Protocol read response format 608 of FIG. 6). In block 912, the protocol block 410 transmits the translated transaction response to the preceding NPI switch 408 in the tree topology. The protocol block 410 can transmit the translated transaction response to the preceding NPI switch 408 on a data flit per clock cycle basis, for example.

The order of operations in this flow chart is merely an example, and various operations can be implemented in different logical orders. A person having ordinary skill in the art will readily understand different orders of operations that may be implemented in other examples and any modifications to the flow chart of FIG. 9 to implement those different orders. Further, a person having ordinary skill in the art will understand that the operations of FIG. 9 may be performed in parallel for different transaction requests and transaction responses, such as in pipelined processing. Various buffers may be implemented to accommodate pipelined or other processing, for example.

Figure 10:
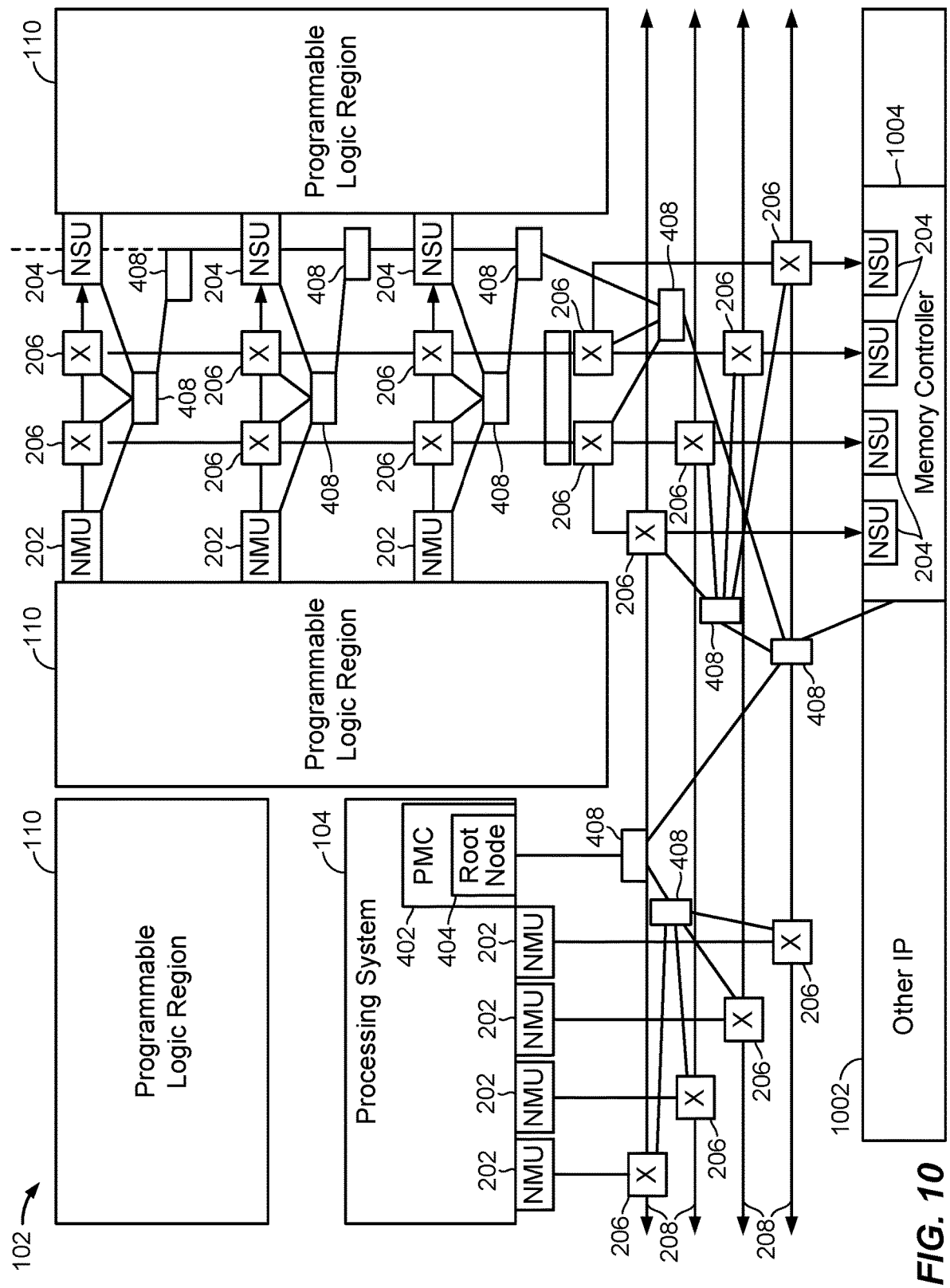
FIG. 10 is a simplified schematic of at least a portion of the SoC according to some examples.

FIG. 10 is a simplified schematic of at least a portion of the SoC 102 according to some examples. The illustrated SoC 102 includes an NoC 106 interconnected between the processing system 104, programmable logic regions 110, and other IP 1002 (such as a memory controller 1004), for example. The NoC 106 includes NMUs 202 connected to NSUs 204 through interconnected NoC packet switches 206 and routing 208, which interconnected NoC packet switches 206 and routing 208 form the network 214 having the physical channels 306 and virtual channels 308, for example. The NoC 106 further includes the NPI 210, which includes the root node 404 (that resides on the PMC 402 in the processing system 104), the NPI switches 408 in a tree topology, and protocol blocks 410 connected to slave endpoint circuits. The protocol blocks 410 are not specifically illustrated for simplicity, but may be in the tree topology disposed preceding respective slave endpoint circuits. The slave endpoint circuits, for example, include register blocks 212 of the NoC packet switches 206, NMUs 202, NSUs 204, memory controller 1004, and/or others.

Figure 11:
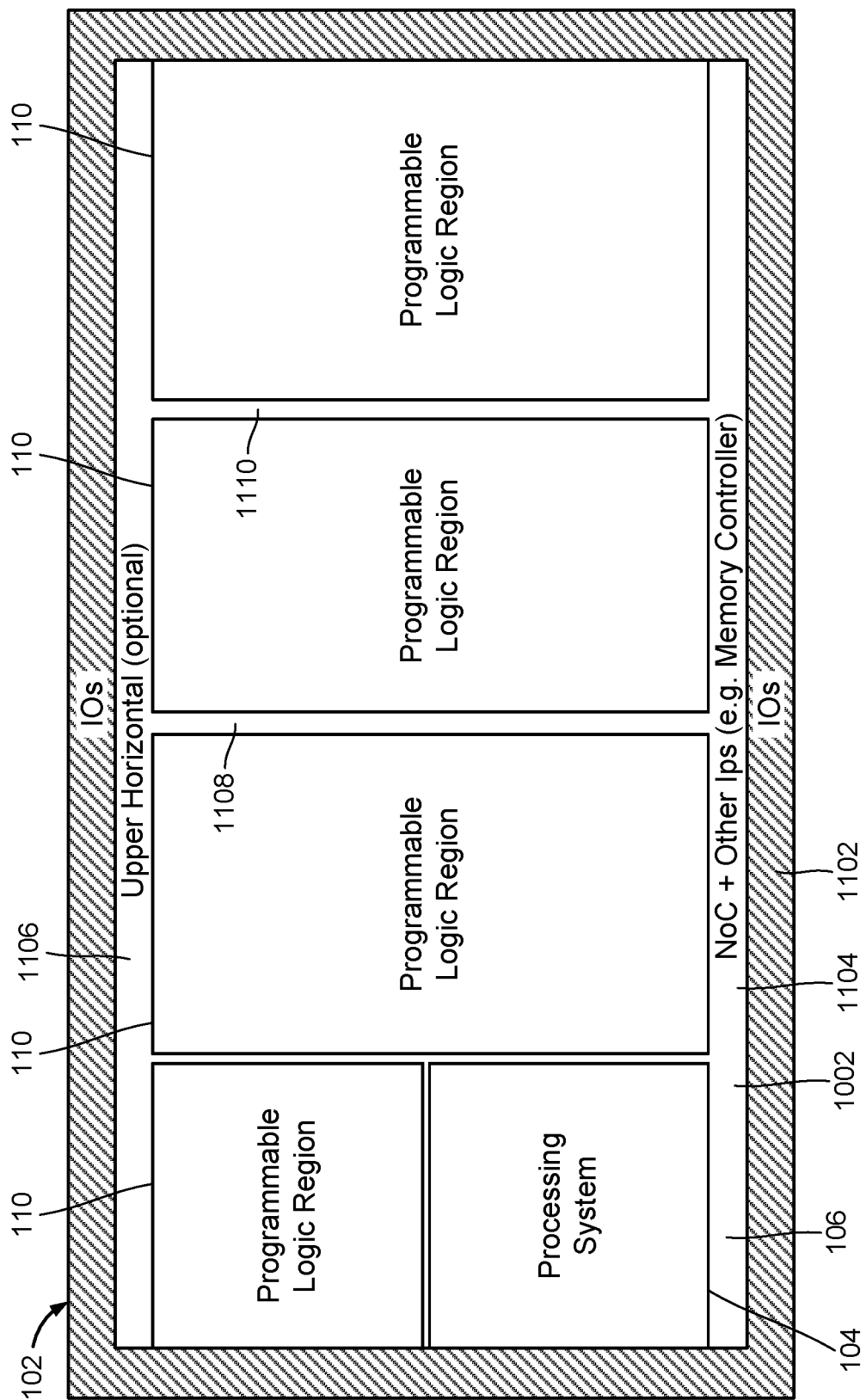
FIG. 11 is an example simplified floorplan of the SoC according to some examples.

FIG. 11 is an example simplified floorplan of the SoC 102 according to some examples. The floorplan includes respective regions for the processing system 104, programmable logic regions 110, NoC 106 and other IP 1002, and inputs/outputs (IOs) 1102. The IOs 1102 circumscribe other regions of the SoC 102 along the exterior of the SoC 102. The region for the NoC 106 extends horizontally across the SoC 102 with a first horizontal portion 1104 and a second (optional) horizontal portion 1106, and vertically across the SoC 102 with a first vertical portion 1108 and a second vertical portion 1110.

Because the NoC 106 (and hence, also the NPI 210) extends across the SoC 102 in the example of FIG. 11, the NPI 210 can include asynchronous crossings at boundaries between different clock domain regions. A SoC 102 may include multiple clock domain regions through which the NoC 106 and NPI 210 cross. The clock domain regions generally operate on different respective clock signals, and those clock signals may have some latency or phase difference between various ones of the clock signals. Hence, the asynchronous crossings can address and accommodate differences between clock signals in different clock domain regions.

Examples described herein can enable a distributed, low-overhead, high-performance, and independent peripheral interconnect, such as the NPI 210. The NPI 210 can implement a tree topology for delivering memory-mapped transactions to slave endpoint circuits. The NPI 210 can be distributed across a large area of a chip, such as a substantial entirety of the chip. Further, in ICs that include programmable logic regions 110, the NPI 210 can write to and read from slave endpoint circuits independently of the configuration interconnect 108 for programming the programmable logic regions 110 and without using resources of the fabric of the programmable logic regions 110. Hence, in examples implementing an NoC 106, the NoC 106 can be programmed using the NPI 210 before the programmable logic regions 110 are programmed. This can allow the SoC 102 to implement system-level programming to configure the SoC 102 before programming the fabric of the programmable logic regions 110. The NPI 210 can also be a delivery mechanism for control to blocks that can be independently programmed or controlled throughout the SoC 102, such as for partial reconfiguration scenarios.

While the foregoing is directed to specific examples, other and further examples may be devised without departing from the basic scope thereof, and the scope thereof is determined by the claims that follow.

What is claimed is:

1. An apparatus comprising:
   a processing system on a chip;
   a circuit block on the chip; and
   a configurable communication system on the chip, the configurable communication system comprising a configurable network and a peripheral interconnect, the processing system and the circuit block being connected to the configurable network, the peripheral interconnect comprising:
   a root node; and
   a plurality of switches, the root node and the plurality of switches being connected in a tree topology, first branches of the tree topology being connected to respective slave endpoint circuits of the configurable network, the slave endpoint circuits of the configurable network being programmable, via the peripheral interconnect, to configure the configurable network.

2. The apparatus of claim 1, wherein at least one second branch of the tree topology is connected to a respective slave endpoint circuit of another circuit distinct from the configurable network.

3. The apparatus of claim 1, wherein each of the slave endpoint circuits of the configurable network includes addressable registers.

4. The apparatus of claim 1, wherein the root node is disposed in the processing system.

5. The apparatus of claim 1, wherein the peripheral interconnect extends across the chip in at least one direction.

6. The apparatus of claim 1, wherein the peripheral interconnect extends across multiple clocking domains.

7. The apparatus of claim 1 further comprising a configuration interconnect, and wherein:
   the circuit block is a programmable logic region;
   the processing system is connected to the programmable logic region through the configuration interconnect for programming the programmable logic region; and
   the slave endpoint circuits of the configurable network are programmable through the peripheral interconnect without using a resource of the programmable logic region.

8. The apparatus of claim 1, wherein:
   the root node is the single interface of the tree topology configured to receive a first transaction request originating from a component outside of the configurable network;
   the root node is configured to transmit a second transaction request to one of the plurality of switches, the second transaction request corresponding to the first transaction request and comprising a destination identification of a respective one slave endpoint circuit; and
   ones of the plurality of switches that receive the second transaction request are configured to determine on which subsequent branch to transmit the second transaction request based on the destination identification.

9. The apparatus of claim 8, wherein the ones of the plurality of switches that receive the second transaction request are further configured to initiate blocking when a previous transaction request remains pending on a subsequent branch different from the determined subsequent branch on which the second transaction request is to be transmitted.

10. A method for operating an integrated circuit, the method comprising:
- receiving a first transaction request at a root node on a chip from a master circuit on the chip;
- transmitting a second transaction request from the root node to a tree topology comprising switches on the chip, the second transaction request corresponding to the first transaction request and comprising a destination identification of a slave endpoint circuit to which the first transaction request is directed;
- receiving the second transaction request at at least one switch in the tree topology;
- for each of the at least one switch that receives the second transaction request, determining on which subsequent branch of the tree topology to transmit the second transaction request based on the destination identification; and
- for each of the at least one switch that receives the second transaction request, transmitting the second transaction request on the determined subsequent branch of the tree topology, wherein each branch of the tree topology is connected to a respective slave endpoint circuit, at least some of the slave endpoint circuits being configurable components of a configurable network on the chip.

11. The method of claim 10 further comprising translating at the root node the first transaction request from a format implemented by the master circuit into the second transaction request in a format implemented in the tree topology.

12. The method of claim 10 further comprising translating, at a protocol block at an interface between a branch of the tree topology and the slave endpoint circuit to which the first transaction request is directed, the second transaction request from a format implemented in the tree topology into a third transaction request in a format implemented by the slave endpoint circuit to which the first transaction request is directed.

13. The method of claim 10 further comprising:
- for each of the at least one switch that receives the second transaction request:
  - determining whether a branching condition exists, the branching condition existing when a previous transaction request remains pending on a subsequent branch of the tree topology different from the determined subsequent branch on which the second transaction request is to be transmitted; and
  - initiating blocking when the branching condition exists, wherein the respective switch that initiates the blocking does not transmit any transaction request during the blocking.

14. The method of claim 10 further comprising:
- receiving a first transaction response at a branch of the tree topology connected to the slave endpoint circuit to which the first transaction request is directed, the first transaction response being generated by the slave endpoint circuit to which the first transaction request is directed in response to the second transaction request; and
- transmitting a second transaction response through the at least one switch that received the second transaction request to the root node.

15. The method of claim 10 further comprising transmitting a first response from the root node to the master circuit in response to the first transaction request, the first response being transmitted from the root node before a second response from the tree topology in response to the second transaction request is received by the root node.

16. An apparatus comprising:
- an integrated circuit on a chip, the integrated circuit comprising:
  - a processing system on the chip;
  - a programmable logic region on the chip;
  - a configuration interconnect on the chip and connected between the processing system and the programmable logic region, the processing system being configured to program the programmable logic region via the configuration interconnect; and
  - a configurable communication system on the chip, the configurable communication system comprising a configurable network and a peripheral interconnect, the configurable network being connected to the processing system and the programmable logic region, programmable components of the configurable network being programmable via the peripheral interconnect to provide communication channels through the configurable network, the peripheral interconnect comprising:
    - a root node; and
    - switches, the root node and the switches being connected in a tree topology, first branches of the tree topology being connected to the programmable components of the configurable network.

17. The apparatus of claim 16, wherein the peripheral interconnect extends across the chip in at least one direction, and extends across multiple clocking domains of the chip.

18. The apparatus of claim 16, wherein the programmable components of the configurable network are programmable through the peripheral interconnect without using a resource of the programmable logic region.

19. The apparatus of claim 16, wherein the integrated circuit further comprises a memory controller on the chip, a second branch of the tree topology is connected to a programmable component of the memory controller.

20. The apparatus of claim 16, wherein:
- the root node is the single interface of the tree topology configured to receive a first transaction request originating from a component outside of the configurable network;
- the root node is configured to transmit a second transaction request to one of the switches, the second transaction request corresponding to the first transaction request and comprising a destination identification of a slave endpoint circuit; and
- each of the switches that receive the second transaction request are configured to determine on which subsequent branch to transmit the second transaction request based on the destination identification.

* * * * *